(12) United States Patent
Köth et al.

(10) Patent No.: US 9,302,656 B2
(45) Date of Patent: Apr. 5, 2016

(54) ELECTROMECHANICAL PARKING BRAKE DEVICE AND ELECTRONIC SYSTEM FOR OPERATING SAME

(75) Inventors: Boris Köth, Weitersburg (DE); Bernd Schönwald, Leonberg (DE); Ralf Leiter, Mendig (DE); Stefan Grieser-Schmitz, Koblenz (DE)

(73) Assignee: Lucas Automotive GmbH, Koblenz (DE)

( * ) Notice: Subject to any disclaimer, the term of this patent is extended or adjusted under 35 U.S.C. 154(b) by 849 days.

(21) Appl. No.: 11/792,404

(22) PCT Filed: Dec. 9, 2005

(86) PCT No.: PCT/EP2005/013232
§ 371 (c)(1),
(2), (4) Date: Jun. 5, 2007

(87) PCT Pub. No.: WO2006/061238
PCT Pub. Date: Jun. 15, 2006

(65) Prior Publication Data
US 2008/0105502 A1    May 8, 2008

(30) Foreign Application Priority Data
Dec. 9, 2004    (DE) .......................... 10 2004 059 546

(51) Int. Cl.
*B60T 15/14*    (2006.01)
*B60T 7/08*    (2006.01)
*B60T 13/74*    (2006.01)

(52) U.S. Cl.
CPC *B60T 7/085* (2013.01); *B60T 13/74* (2013.01)

(58) Field of Classification Search
USPC ....................... 188/265; 303/20, 89
See application file for complete search history.

(56) References Cited

U.S. PATENT DOCUMENTS

| 5,255,962 | A |   | 10/1993 | Neuhaus et al. |
|---|---|---|---|---|
| 5,752,748 | A |   | 5/1998 | Schramm et al. |
| 5,961,190 | A |   | 10/1999 | Brandmeier et al. |
| 6,019,436 | A | * | 2/2000 | Siepker .......................... 303/13 |
| 6,139,117 | A | * | 10/2000 | Shirai ..................... B60T 13/74 188/1.11 R |

(Continued)

FOREIGN PATENT DOCUMENTS

| DE | 197 32 168 C1 | 1/1999 |
|---|---|---|
| DE | 19832950 B4 | 8/1999 |

(Continued)

OTHER PUBLICATIONS

Machine Translation of WO 99/26821; obtained from www.espacenet.com.*

(Continued)

*Primary Examiner* — Nicholas J Lane
(74) *Attorney, Agent, or Firm* — MacMillan, Sobanski & Todd, LLC

(57) ABSTRACT

It is proposed, for an electronic system for operating an electromechanical parking brake device of a vehicle with an input unit for detecting a driver command which is evaluated by a control unit which activates at least one actuating unit for actuating at least one brake, that the control unit consist of at least two control components, of which a first control component is associated with the input unit and at least one second control component is associated with the at least one actuating unit.

8 Claims, 4 Drawing Sheets

(56) References Cited

U.S. PATENT DOCUMENTS

| | | | |
|---|---|---|---|
| 6,213,567 B1 | 4/2001 | Zittlau et al. | |
| 6,216,080 B1 | 4/2001 | Riedemann et al. | |
| 6,256,568 B1 | 7/2001 | Siepker et al. | |
| 6,299,261 B1 * | 10/2001 | Weiberle et al. | 303/20 |
| 6,317,675 B1 | 11/2001 | Stölzl et al. | |
| 6,345,225 B1 | 2/2002 | Bohm et al. | |
| 6,394,235 B1 | 5/2002 | Poertzgen et al. | |
| 6,449,551 B1 | 9/2002 | Wrede | |
| 6,513,885 B1 * | 2/2003 | Salamat et al. | 303/122.09 |
| 6,881,175 B2 * | 4/2005 | Loibl | 477/182 |
| 7,396,089 B2 * | 7/2008 | Bennett et al. | 303/119.2 |
| 2001/0045771 A1 * | 11/2001 | Corio et al. | 303/20 |
| 2002/0092720 A1 * | 7/2002 | Schafer et al. | 188/158 |
| 2003/0006644 A1 | 1/2003 | MacGregor et al. | |
| 2003/0006726 A1 | 1/2003 | Weiberle et al. | |
| 2004/0015281 A1 * | 1/2004 | Weiberle | 701/70 |
| 2004/0041471 A1 | 3/2004 | Hellmann et al. | |
| 2004/0201270 A1 * | 10/2004 | Suzuki | B60T 13/741 303/20 |
| 2004/0239173 A1 * | 12/2004 | Williams et al. | 303/3 |
| 2006/0235594 A1 | 10/2006 | Knoefler et al. | |
| 2006/0279136 A1 | 12/2006 | Haeussler et al. | |

FOREIGN PATENT DOCUMENTS

| | | | |
|---|---|---|---|
| DE | 19814657 A1 | 10/1999 | |
| DE | 19831733 A1 | 1/2000 | |
| DE | 198 54 788 A1 | 5/2000 | |
| DE | 19949914 B4 | 10/2000 | |
| DE | 19814657 C2 | 12/2000 | |
| DE | 19954284 A1 | 5/2001 | |
| DE | 101 18 262 A1 | 10/2002 | |
| DE | 19949914 B4 | 9/2005 | |
| EP | 0467112 A2 | 1/1992 | |
| EP | 0467116 A2 | 1/1992 | |
| EP | 0 780 276 A2 | 6/1997 | |
| EP | 0 995 659 A1 | 4/2000 | |
| EP | 0 995 922 A2 | 4/2000 | |
| EP | 1032518 A1 | 9/2000 | |
| EP | 1 128 999 B1 | 9/2001 | |
| EP | 1032518 B1 | 5/2003 | |
| EP | 1633614 A2 | 3/2006 | |
| EP | 1633614 B1 | 9/2008 | |
| JP | 2004343814 A | 12/2004 | |
| JP | 2006515084 A | 5/2006 | |
| WO | 9513946 A1 | 5/1995 | |
| WO | WO 99/26820 | 6/1999 | |
| WO | WO 99/26821 | 6/1999 | |

OTHER PUBLICATIONS

LIN Specification Package, Revision 2.0, Dated Sep. 23, 2003; selected pp. 1-6 and 12-14.*

Translation of Decision of Rejection from Japanese Patent Office in corresponding Japanese Patent Application, Single page, dated Apr. 26, 2012.

Translation of the Observations of the Patent Proprietor to the Notice of Opposition Filed Against Corresponding EP1819567B1, pp. 1-9, Filed Apr. 17, 2012 with EPO.

* cited by examiner

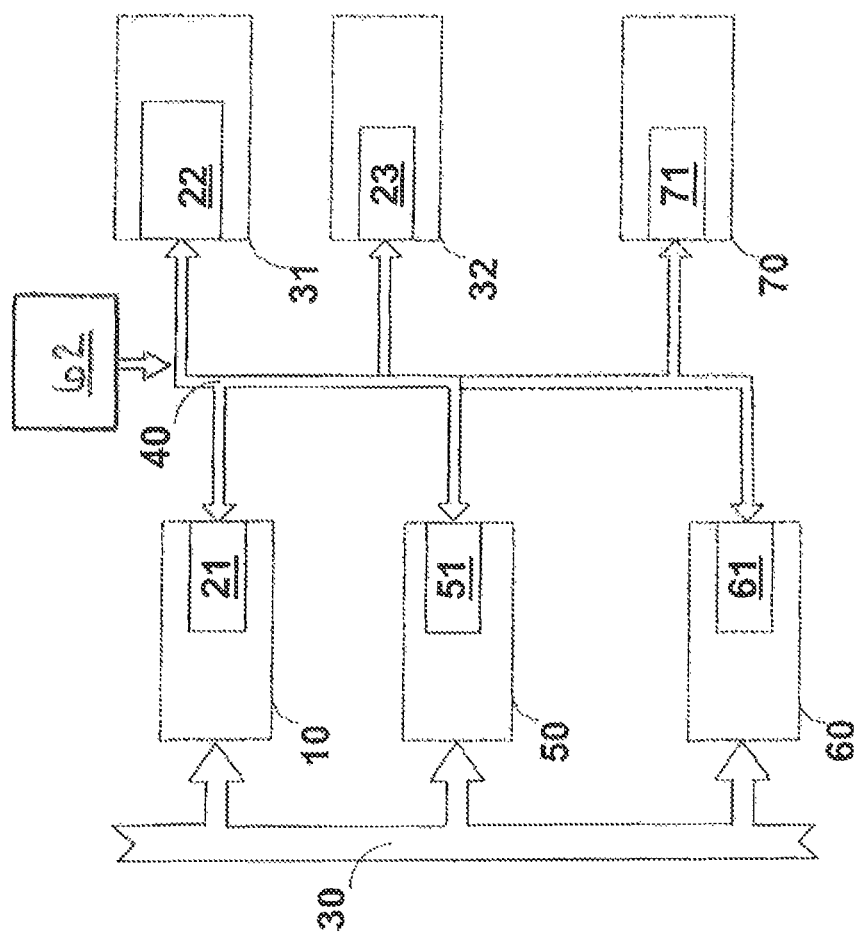

ELECTROMECHANICAL PARKING BRAKE DEVICE AND ELECTRONIC SYSTEM FOR OPERATING SAME

CROSS-REFERENCE TO RELATED APPLICATIONS

This application is a National Stage of International Application No. PCT/EP2005/013532 filed Dec. 9, 2005, the disclosures of which are incorporated herein by reference in entirety, and which claimed priority to German Patent Application No. 10 2004 059 546.1 filed Dec. 9, 2004, the disclosures of which are incorporated herein by reference in entirety.

BACKGROUND OF THE INVENTION

The invention relates to an electronic system for operating an electromechanical parking brake device of a vehicle, with an input unit for detecting a driver command which is evaluated by a control unit which activates at least one actuating unit for actuating at least one brake.

An electromechanical parking brake device is known, inter alia, from DE 197 32 168 C1, and corresponding U.S. Pat. No. 6,394,235, both of which are incorporated by reference herein in entirety. A spindle/nut arrangement, which is actuated by an electric motor, serves as the actuating unit here, by means of which arrangement the brake piston of a brake of the service brake device can be mechanically locked.

An input unit for detecting a driver command for an electromechanical parking brake device is known from EP 1 128 999 B1. In this case the input unit is connected to an electronic control unit which directly converts the signals delivered by the input unit into corresponding activation signals for an actuating unit in order to change the parking brake device over to the desired actuating state.

According to EP 1 128 999 B1, in order also to enable the driver command relating to an actuation of the parking brake device, i.e. application or release, to be recognised and at the same time a fault diagnosis to be made in the event of a fault, the input unit must be constructed as a key or rocker key with a plurality of switch positions and deliver at least two redundant signals to the electronic control unit in each switch position.

This entails the disadvantage of having to connect a plurality of lines in parallel for the electrical connection between the input unit and the control unit. Thus, according to EP 1 128 999 B1, a total of eight lines, including the supply and earth lines, must be provided just for three switch positions and two redundant signals per switch position. This clearly illustrates the extent of the expenditure for the electrical connection between the input unit and the control unit, especially as reliable electrical contacting, e.g. a plug connection, has to be provided both on the input unit side and on the control unit side for each line.

BRIEF SUMMARY OF THE INVENTION

The feature of the invention is to counteract the above-mentioned disadvantage while maintaining the system security.

In order to achieve the feature, the invention proposes that the control unit comprise at least two control components, of which a first control component is associated with the input unit and at least one second control component is associated with the at least one actuating unit.

It is thus possible to dispense with the control unit as such which is required in known systems, as it is divided into appropriate control components which can be appropriately distributed in terms of location and function among the input unit and the at least one actuating unit and integrated here.

Therefore not only are economies made on the expenditure for the housing and the installation space of the control unit required in known systems, but also, in particular, the expenditure for electrical contacting between the input unit and the at least one actuating unit is reduced. For it is possible to dispense with an expensive electrical connection between the input unit and the usually customary control unit, since, for example, the input unit and the first control component can be disposed on a common printed circuit board. It is likewise possible to dispense with the electrical connection between the usually customary control unit and the at least one actuating unit, which is likewise of an expensive type in known systems, as it must be designed for the relatively high loads of the electrical actuation mechanism, e.g. electric motor or electromagnet, of the actuating unit.

It is advantageously possible for the control component which is associated with the input unit to be the control centre of the system which evaluates the driver command and undertakes the corresponding activation (e.g. application or release) of the at least one actuating unit. This "control centre" consequently comprises the computer or microprocessor unit which is now customary in an electronic system and controls and/or regulates the actuating state required for the parking brake device and on which the control or regulating algorithm can be implemented by means of software. As the input unit is in any case located at a location in the vehicle interior which can be conveniently operated by the driver, the computer or microprocessor unit is as a rule accommodated in a protected manner.

It is likewise advantageously possible for the at least one control component which is associated with the at least one actuating unit to comprise power switches such as transistors, which are required to activate the actuating unit. The control component which is integrated into the input unit therefore has no power switches which subject the input unit to a thermal load, so that no expensive cooling measures are required for this. On the other hand, the additional thermal load which is thereby generated in an actuating unit is to be considered as less critical, as the actuating unit comprises electrical actuation mechanisms which, on account of their relatively high electrical load, generate a considerable amount of heat, for which cooling measures are in any case taken.

The "outsourcing" or "removal" of the power switches also has the advantage of enabling the electrical connection between the control components of the input unit and the at least one actuating unit to be in the form of "simple" electric lines, as it does not have to be designed for high current loads.

If the control component of the at least one actuating unit is provided with an electronic interface, which could also be a "simple" computer or microprocessor unit, the control components can interact via a communication system (e.g. a CAN bus, a LIN bus or another bus system) to great advantage. In this case this could be a communication system which is specially provided for the parking brake device, although a communication system which is in any case provided in the vehicle could also be used at the same time, via which system interaction with other vehicle systems, e.g. a service brake device provided with ABS or ESP or an engine power control unit, would in addition be possible.

In some situations it may be expedient to provide redundancy relating to the communication system between the control components. According to one development of this approach, an independent power supply is provided for at least one of the redundantly provided communication systems or one of the redundantly provided communication system parts. This independent power supply is expediently also available when the vehicle is parked. It is thus possible to guarantee re-application of the parking brake even when the ignition is turned off.

The second control component associated with the actuating unit can communicate with one or more further system units. Thus a further system unit may be associated with an automatic transmission. The further system unit associated with the automatic transmission expediently enables the parking brake device to be locked in a transmission position associated with the "park" state.

Other advantages of this invention will become apparent to those skilled in the art from the following detailed description of the preferred embodiments, when read in light of the accompanying drawings.

BRIEF DESCRIPTION OF THE DRAWINGS

FIGS. 1 thru 4 are illustrations in which four preferred embodiments of electronic systems according to the invention are represented in block diagrams.

DETAILED DESCRIPTION OF THE INVENTION

Figure 1:
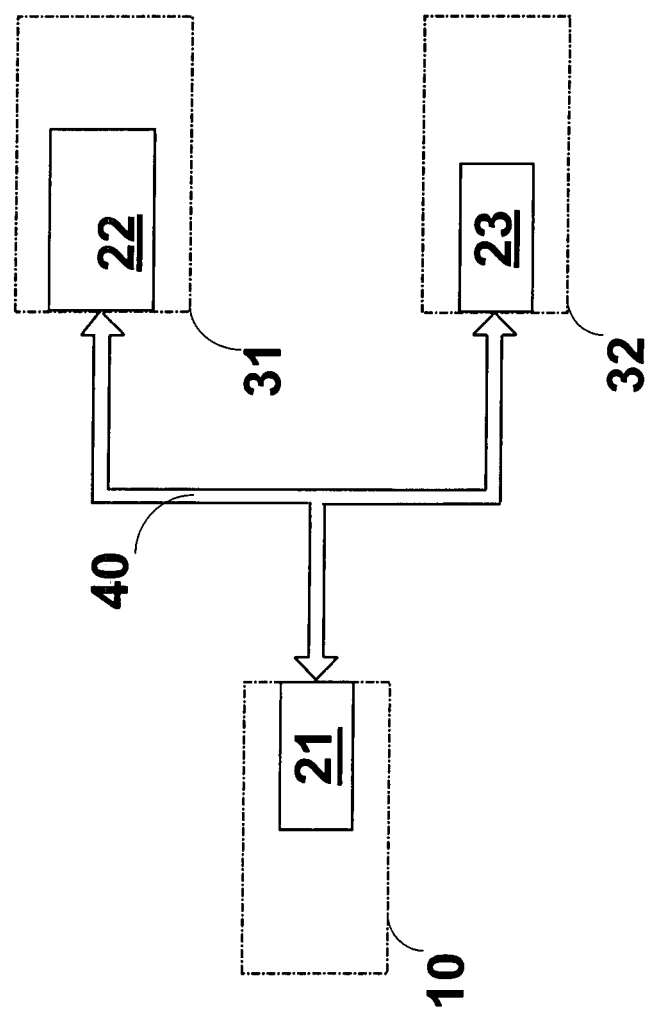

According to the first embodiment which is represented in FIG. 1, an electronic control component 21 is integrated into a system unit 10 which may be, for example, an input unit which detects a driver command for actuating the parking brake system by means of a switching means.

The electronic control component 21, as the so-called "master", comprises a central computer unit which evaluates the driver command and determines the activation of the parking brake device. For this purpose the electronic control component 21 interacts through data exchange via a communication system 40, e.g. a CAN bus or a LIN bus, with other electronic control components 22 and 23 which are called "slaves" and are integrated into actuating units 31 and 32, which are associated with the brakes of the vehicle. On account of the integration of the electronic control components 22 and 23, the actuating units 31 and 32 thus represent so-called "smart" actuators.

Figure 2:
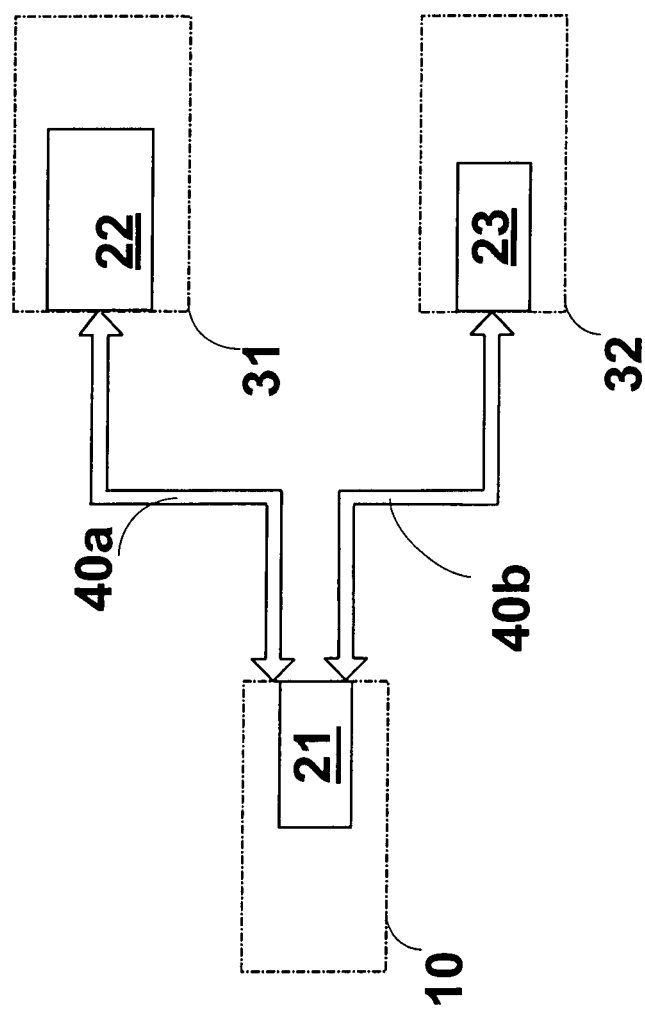

As compared with the embodiment which is represented in FIG. 1, a redundantly formed communication system 40a, 40b for the electronic control components 22, 23 is provided in the embodiment according to FIG. 2. The electronic control component 21 of the system unit 10 interacts via the first communication system part 40a with the electronic control component 22 of the first actuating unit 31 and via the second communication system part 40b with the electronic control component 23 of the second actuating unit 32. It is as a result still possible to activate at least one of the actuating units 22, 23 if one of the two communication system parts 40a, 40b fails. This specifically means for the parking brake system that, in the event of a fault, at least one of the actuating units 31, 32 associated with the brakes can still be actuated in order to meet the legal minimum requirement (e.g. holding the vehicle on a hill with a gradient of 8%).

Figure 3:
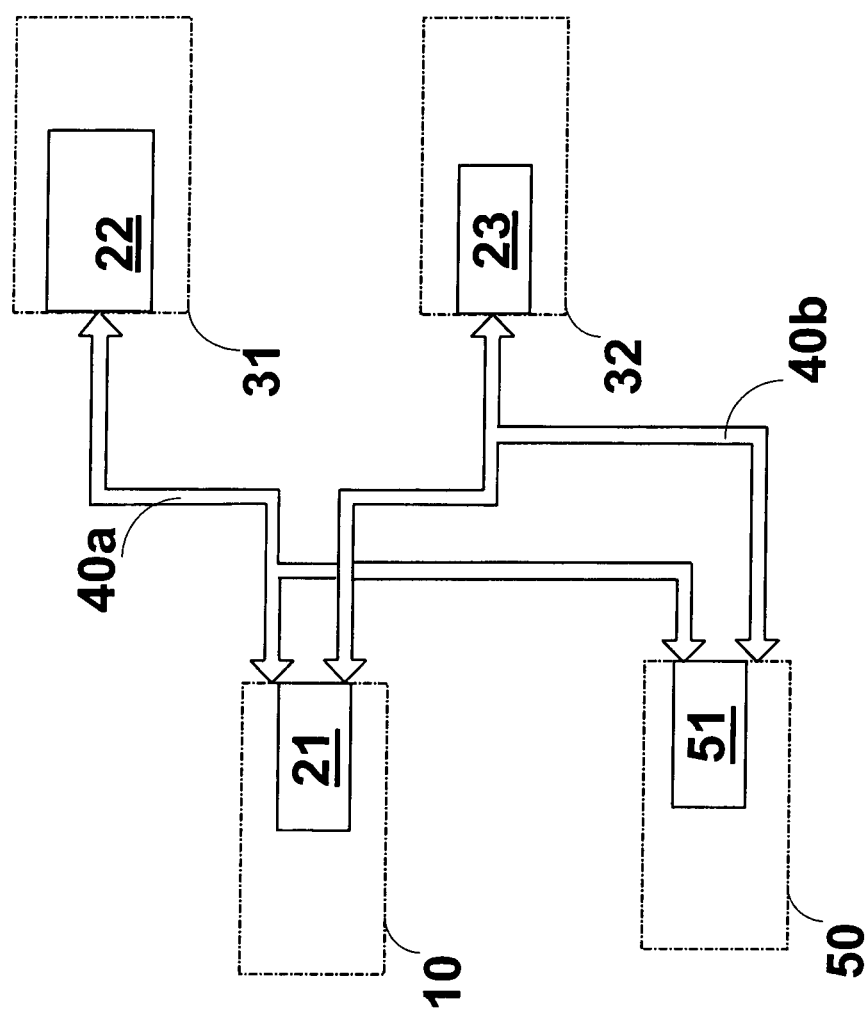

Broadening the embodiment which is shown in FIG. 2, the embodiment which is shown in FIG. 3 comprises a further system unit 50 with its own electronic control component 51, which interacts via a redundantly formed communication system 40a, 40b with the electronic control components 22 and 23. The redundantly provided communication system parts 40a, 40b are provided parallel to one another, as in the second embodiment.

The embodiment according to FIG. 3 can be appropriately applied if an actuation of the actuating units 31 and 32 or of the brakes associated with these is also to take place independently of the system unit 10. This is the case, for example, when the system unit 50 is the control unit of an automatic transmission in which, for example, automatic locking of the electromechanical parking brake system takes place in the transmission position marked by "park" or, in brief "P". This can save expenditure and costs for the usually customary transmission lock (parking lock).

According to the embodiment which is shown in FIG. 3, an actuation of the parking brake device is therefore possible both by means of its actual operating element, the input unit 10, and by means of the operating element of the system unit 50, which, in the case of an automatic transmission, is the latter's selector lever which is to be operated by the driver. The same naturally also applies if the system unit 50 is the control unit of an anti-theft device, an ignition lock, etc. Here too there is the advantage that, because of the access to the communication system 40a and 40b, respectively, the respective system unit 50 does not have to be provided with additional, expensive power switches in order to actuate the parking brake device.

As in the case of the embodiment according to FIG. 1, a common communication system 40 is shown in the embodiment according to FIG. 4. Also provided is a standard communication system 30 in the form of a CAN bus. Additional electrical control components 71 of further actuating units 70 are connected to the communication system 40. An example would be a steering wheel lock which is actuated instead of or in addition to the lock of the electromechanical parking brake device mentioned in connection with the embodiment according to FIG. 3 in order to lock the steering wheel in position when the vehicle is parked for the purpose of theft protection.

It may likewise be of advantage for electrical control components 61 of system units 60 which are in any case provided in the vehicle, e.g. the service brake device provided with ABS or ESP or the engine power control unit, to be connected to the communication system 40 in order to actuate the parking brake device independently of the system unit 10 during automated starting and stopping operations on slopes or in "stop-and-go" traffic, for example.

The communication system can in principle be a communication system which is in any case provided in the vehicle (e.g. CAN bus or LIN bus, cf. FIG. 4) or also use such a system. However, for system security, it is of advantage to configure the communication system of the parking brake device as an independent system. For the parking brake device can thus still be actuated (e.g. re-applied when the vehicle is parked) even in the event of failure or disconnection of the communication system which is in any case provided in the vehicle. In this respect the system security is particularly high when an independent power supply 62 (e.g. shown in FIG. 4), is provided for the communication system of the parking brake device.

It is understood that the features and advantages which are mentioned in relation to the embodiments according to FIGS. 1 to 4 can also be freely combined with one another. Thus it may also be of advantage to use a redundant communication system, for example, in the embodiment according to FIG. 4, as in the case of the embodiments according to FIGS. 2 and 3.

A system according to one of the above embodiments is not only possible in combination with an electromechanical parking brake, but can also generally replace conventional control devices, for example for an electrical window lifter, an electrical seat adjustment unit or an electrical sliding roof. It is also possible to use it in safety-critical industrial plant. In all these fields of use the "master-slave" concept which is proposed here enables contacting and cabling to be optimised and, linked with this, possible sources of disturbances and faults to be eliminated.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. An electronic system for operating an electromechanical parking brake device of a vehicle, with at least one input unit for detecting a driver command which is evaluated by a control unit which activates at least one electric motor for actuating at least one brake, wherein the control unit comprises at least two control components, of which a first electronic control component is integrated into the input unit and at least one second electronic control component is integrated into at least one actuator further comprising the at least one electric motor, wherein the first electronic control component and the at least one second electronic control component are in a master-slave relationship, whereby only the first electronic control component is able to initiate a communication with the at least one second electronic control component, wherein the at least one second electronic control component comprises power switches which are required to switch a load current of the at least one electric motor, wherein a system unit with a third electronic control component is provided, which third electronic control component directly communicates with the at least one second control component of the at least one electric motor, wherein the system unit is a control unit of an automatic transmission, and wherein the parking brake device is configured to be operated by the third electronic control component, wherein actuation of the parking brake device can be effected by both the input unit and by an operating element of the system unit, wherein the system unit enables a locking of the parking brake device in a transmission position of the automatic transmission associated with a park state of the vehicle, and further, wherein at least the first and second electronic control components communicate with one another via a redundantly provided communication system, wherein an independent power supply is provided for the redundantly provided communication system, and wherein the independent power supply is also available when the vehicle is in the park state with an ignition of the vehicle turned off, so that the parking brake can be re-applied even when the ignition is turned off.

2. The system according to claim 1, wherein the first control component which is associated with the input unit evaluates the driver command and determines the activation of the at least one actuating unit.

3. The system according, to claim 1, wherein the at least two control components communicate with one another via at least one bus system of the redundantly provided communication system.

4. An electromechanical parking brake device comprising:
an electronic system with at least one input unit for detecting a driver command which is evaluated by a control unit which activates at least one electric motor for actuating at least one brake of a vehicle, wherein the control unit comprises at least two control components, of which a first electronic control component is integrated into the input unit and at least one second electronic control component is integrated into at least one actuator further comprising the at least one electric motor, wherein the first electronic control component and the at least one second electronic control component are in a master-slave relationship, whereby only the first electronic control component is able to initiate a communication with the at least one second electronic control component, wherein the at least one second electronic control component comprises power switches which are required to switch a load current of the at least one electric motor, wherein a system unit with a third electronic control component is provided, which third electronic control component directly communicates with the at least one second electronic control component of the at least one electric motor, wherein the system unit is a control unit of an automatic transmission, and wherein the parking brake device is configured to be operated by the third electronic control component, wherein actuation of the parking brake device can be effected by both the input unit and by an operating element of the system unit, wherein the system unit enables a locking of the parking brake device in a transmission position of the automatic transmission associated with a park state of the vehicle, and further, wherein at least the first and second electronic control components communicate with one another via a redundantly provided communication system, wherein an independent power supply is provided for the redundantly provided communication system, and wherein the independent power supply is also available when the vehicle is in the park state with an ignition of the vehicle turned off, so that the parking brake can be re-applied even when the ignition of the vehicle is turned off.

5. The electromechanical parking brake device according to claim 4, wherein the first control component which is associated with the input unit evaluates the driver command and determines the activation of the at least one actuating unit.

6. The electromechanical parking brake device according to claim 4, wherein the at least two control components communicate with one another via at least one bus system of the redundantly provided communication system.

7. The system according to claim 1, wherein the operating element of the system unit is a driver operated selector lever of the automatic transmission.

8. The electromechanical parking brake device according to claim 4, wherein the operating element of the system unit is a driver operated selector lever of the automatic transmission.

* * * * *